US009333664B2

(12) United States Patent
Doane

(10) Patent No.: US 9,333,664 B2
(45) Date of Patent: May 10, 2016

(54) CUTTING TRACK

(71) Applicant: Robert F. Doane, Davis Junction, IL (US)

(72) Inventor: Robert F. Doane, Davis Junction, IL (US)

( * ) Notice: Subject to any disclaimer, the term of this patent is extended or adjusted under 35 U.S.C. 154(b) by 207 days.

(21) Appl. No.: 13/872,651

(22) Filed: Apr. 29, 2013

(65) Prior Publication Data

US 2013/0291701 A1 Nov. 7, 2013

Related U.S. Application Data

(60) Provisional application No. 61/640,923, filed on May 1, 2012.

(51) Int. Cl.

| | |
|---|---|
| ***B23K 9/02*** | (2006.01) |
| ***B26D 7/26*** | (2006.01) |
| ***B61B 13/06*** | (2006.01) |
| *B26D 3/00* | (2006.01) |
| *B26D 7/00* | (2006.01) |

(52) U.S. Cl.

CPC .............. *B26D 7/2614* (2013.01); *B61B 13/06* (2013.01); *B26D 3/001* (2013.01); *B26D 7/0006* (2013.01); *Y10T 83/68* (2015.04)

(58) Field of Classification Search

CPC ........ B23K 7/005; B23K 9/00; B23K 9/0052; B23K 9/225; B23K 9/12; B23K 9/0253; B23K 9/0282; B23K 9/0286

See application file for complete search history.

(56) References Cited

U.S. PATENT DOCUMENTS

| | | | | |
|---|---|---|---|---|
| 4,145,593 | A * | 3/1979 | Merrick et al. | 219/60 A |
| 4,373,125 | A * | 2/1983 | Kazlauskas | 219/60 A |
| 2006/0113073 | A1 * | 6/2006 | Wright et al. | 166/77.51 |

* cited by examiner

*Primary Examiner* — Brian Jennison

(74) *Attorney, Agent, or Firm* — Reinhart Boerner Van Deuren P.C.

(57) ABSTRACT

A cutting system for longitudinally cutting a pipe is provided. The cutting system includes a removable track and a crawler arrangement. The removable track includes: a longitudinal base, first and second races, and an adjustable mounting arrangement. The crawler arrangement is configured to follow the track and carry at least one cutting device. The crawler arrangement includes first and second guides and a tool mounting mechanism.

20 Claims, 12 Drawing Sheets

CUTTING TRACK

CROSS-REFERENCE TO RELATED PATENT APPLICATIONS

This patent application claims the benefit of U.S. Provisional Patent Application No. 61/640,923, filed May 1, 2012, the entire teachings and disclosure of which are incorporated herein by reference thereto.

FIELD OF THE INVENTION

This invention generally relates to mechanisms for longitudinally cutting pipe to form casing or pipe fitting sleeves.

BACKGROUND OF THE INVENTION

Systems for transporting liquids or gases underground often use a carrier pipe located within a casing (i.e. a second pipe) to protect the carrier pipe from external forces. For example, the pipe may cross a location that has large amounts of heavy vehicle traffic at the surface of the ground, such as where the pipe crosses a road or railroad. Additionally, the ground may undergo significant changes in physical condition such as for example temperature changes or moisture changes that can result in changing external forces being applied to the pipes. Thus, the casing will protect the internal carrier pipe.

It is often necessary to install the casing around the carrier pipe after the carrier pipe has been installed. Typically, the retrofit casing must be split in half to form two separate "C-shaped" halves. The halves are then placed around the carrier pipe and then welded back together. Unfortunately, cutting the casing pipe in half is extremely labor intensive. On average, a skilled operator can cut between 6 and 12 inches per minute by hand.

Embodiments of the present invention provide improvements over the state of the art.

BRIEF SUMMARY OF THE INVENTION

A first embodiment of the invention provides a new and improved track for guiding a crawler longitudinally along a pipe for cutting or welding the pipe. The track includes a longitudinal base, first and second races, and an adjustable mounting arrangement. The longitudinal base extends longitudinally along a track axis that is parallel to the longitudinal axis of the pipe when mounted thereto. The first and second races are operably supported by the base. The first and second races extend parallel to the track axis and are laterally offset from one another along an axis (an offset axis) that is perpendicular to the track axis. The adjustable mounting arrangement is operably attached to the base for operably releasably securing the base and the first and second races to pipes having different diameters. The adjustable mounting arrangement includes first and second attachment bars that are transversely offset relative to one another along an offset axis that is perpendicular to the track axis. The first attachment bar is rotatably mounted for rotation about a first bar axis that is parallel to the track axis. The second attachment bar is rotatably mounted for rotation about a second bar axis that is parallel to the track axis.

In one embodiment, the track includes a coupling arrangement for coupling a plurality of tracks. The coupling arrangement includes a tongue and groove arrangement with the tongue located proximate a first end of the base and the groove of the tongue and groove arrangement is located proximate a second, opposite, end of the base.

In one embodiment, the coupling arrangement has transverse alignment structures configured to align the first and second races with a set of first and second races of a second track when a plurality of tracks are coupled to one another using the coupling arrangements thereof.

In one embodiment, the first and second attachment bars are selectively magnetic such that the magnetic power of the attachment bars can be decreased to release the first and second attachment bars from the pipe.

In one embodiment, the first and second attachment bars are magnetic. In another embodiment suction is used, such as for non-magnetic materials.

In one embodiment, the track further includes at least one handle interposed between the first and second races.

In one embodiment, the track includes a first mounting bracket operably attached to the base proximate a first end of the base and a second mounting bracket operably attached to the base proximate a second end of the base axially offset from the first mounting bracket along the track axis. The first and second attachment bars are rotatably mounted to the first and second mounting brackets.

In one embodiment, the base is formed from flat plate. The plate having first and second opposed sides that extend parallel to the track axis. The first side providing the first race and the second side providing the second race.

In one embodiment, a thickness of the flat plate is between about 1/16" and 1/2".

In one embodiment, the flat plate defines a top surface and a bottom surface. The bottom surface faces towards a pipe when mounted thereto. The top surface facing away from the pipe when mounted thereto. Stiffening ribs extend outward from the top surface and longitudinally along the base parallel to the track axis.

In one embodiment, the stiffening ribs are L-shaped angle brackets affixed to the top surface.

In one embodiment, the adjustable mounting arrangement is positioned laterally between the first and second races.

In another embodiment, a cutting system for longitudinally cutting a pipe is provided. The cutting system includes a removable track and a crawler arrangement. The removable track includes: a longitudinal base, first and second races, and a mounting arrangement. The longitudinal base extends longitudinally along a track axis that is parallel to the longitudinal axis of the pipe when mounted thereto. The first and second races are operably supported by the base. The first and second races extend parallel to the track axis and are laterally offset from one another along an axis that is perpendicular to the track axis. The mounting arrangement is operably attached to the base for operably releasably securing the base and the first and second races to a pipe. The crawler arrangement is configured to follow the track and carry at least one cutting device. The crawler arrangement includes first and second guides and a tool mounting mechanism. The first guide is configured to engage and travel along the first race. The second guide is configured to engage and travel along the second race. The first and second guides are transversely offset from one another such that the based is transversely interposed between the first and second guides when the crawler arrangement is mounted to the removable track. The tool mounting mechanism is operably attached to the first and second guides including a tool coupling configured to secure at least one cutting tool in an offset position from the removable track. Typically, the guides are coupled to the tool mounting mechanism through a body of the crawler arrangement.

In one embodiment, the mounting arrangement is adjustable for mounting the track to pipes having different diameters. The mounting arrangement includes first and second attachment bars transversely offset relative to one another along an offset axis that is perpendicular to the track axis. The first attachment bar is rotatably mounted for rotation about a first bar axis that is parallel to the track axis. The second attachment bar is rotatably mounted for rotation about a second bar axis that is parallel to the track axis.

In one embodiment, the tool mounting mechanism is adjustable for adjusting the relative position of the tool coupling.

In one embodiment, the tool mounting mechanism is linearly adjustable along a first axis that is generally perpendicular to the track axis; and the tool mounting mechanism is linearly adjustable along a second axis that is generally perpendicular to the first axis.

In one embodiment, the tool mounting mechanism is rotatably adjustable about the first and second axes.

In one embodiment, the tool coupling is rotatable about a third axis that is generally perpendicular to the first and second axes.

In one embodiment, a tool guide mechanism is provided. The tool guide mechanism is configured to maintain the tool coupling at a desired relative position relative to an outer surface of the pipe as the crawler travels along the pipe. The guide mechanism includes at least one pipe surface follower attached that operably rides along the outer surface of the pipe proximate a cutting location of the pipe and that is operably attached to the tool coupling. The tool guide mechanism further includes a biasing mechanism configured to bias the tool coupling and the pipe surface follower toward the pipe.

In one embodiment, the tool mounting mechanism includes first and second arm segments. The first arm segment extends laterally outward along a first axis that is generally perpendicular to the track axis. The second arm segment is pivotably coupled to the first arm segment for rotation about a fourth axis. The second arm being mechanically operably interposed between the tool coupling and the first arm segment. The biasing mechanism creates a torque about the fourth axis biasing a distal end of the second arm segment and the tool coupling towards the pipe when mounted thereto.

In one embodiment, the track is formed from a plurality of substantially similar track segments. Each track segment includes a coupling arrangement configured for coupling the track segment with another one of the track segments with the first races of the track segments substantially co-axial and the second races of the track segments substantially co-axial.

In one embodiment, the crawler arrangement is mechanically driven such that the guides are mechanically driven along the races, such as by a motor.

In one embodiment, the system includes a plasma cutter attached to the tool coupling. Alternatively, other tools such as water jet, oxy-acetylene or laser cutters could be used.

In one embodiment, the tool mounting mechanism includes two tool couplings including a first and a second tool coupling. The first and second tool couplings being located on opposed sides of the track when the crawler arrangement is attached to the track.

In another embodiment, just a crawler arrangement is provided.

Further, a cutting system according to embodiments of the invention need not include the tool.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
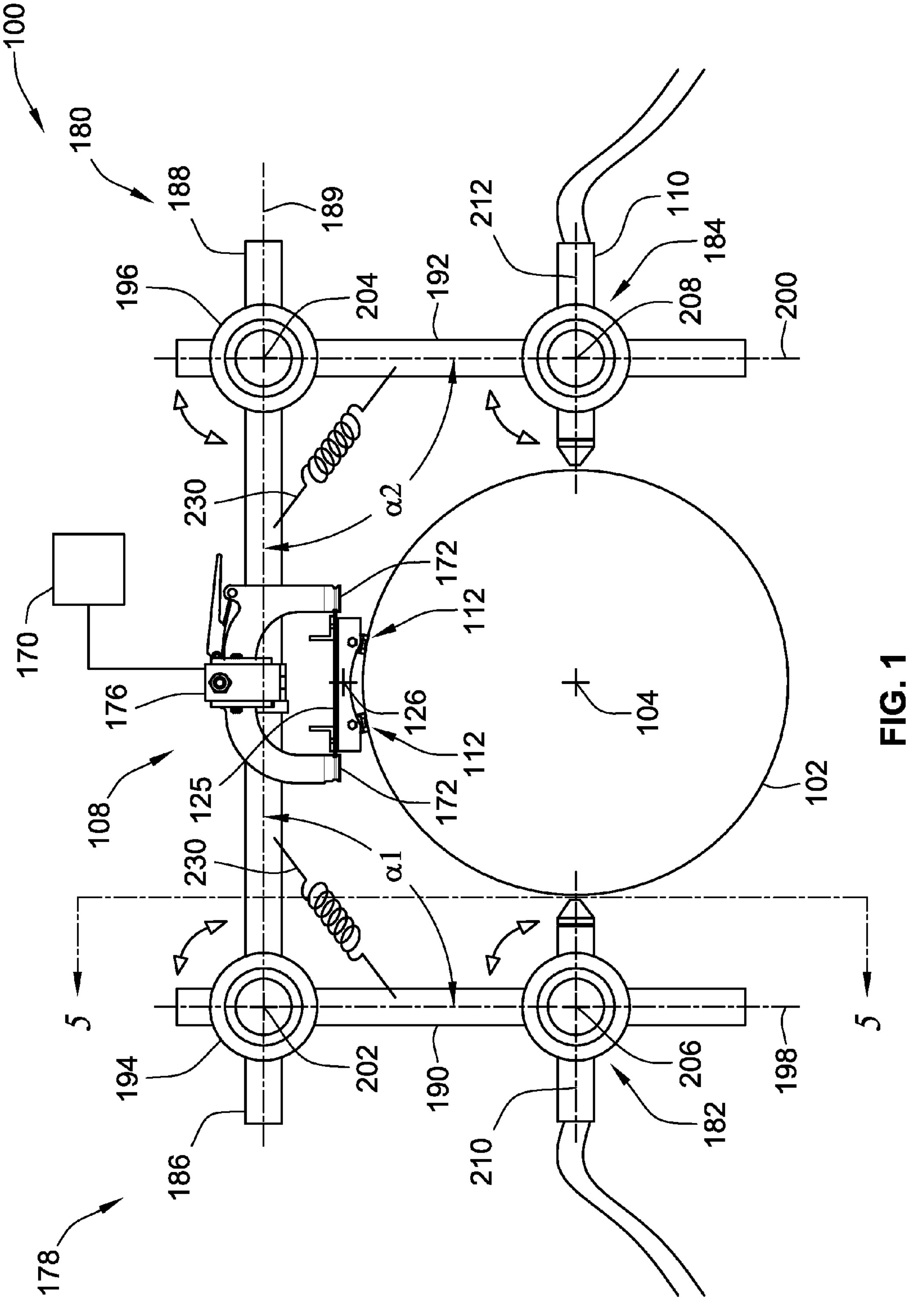
FIG. 1 is a front end view of a cutting system according to an embodiment of the present invention.

FIG. 1 is an end view illustration of a cutting system 100 configured for cutting a pipe 102 along its longitudinal length, i.e. parallel to longitudinal axis 104 (illustrated by a cross-hare) of the pipe 102. This allows the pipe 102 to be cut into two separate halves, typically C-shaped halves. Once cut in-half, the two sections of the pipe can be placed around another object, typically a carrier pipe, and then welded back together.

The cutting system 100 generally includes a track 106, which may be formed from one or a plurality of adjacently positioned segments that guide a crawler arrangement 108 longitudinally along the pipe 102. The crawler arrangement 108 in the illustrated embodiment carries two cutting mechanisms illustrated in the form of plasma cutters 110. However, in other embodiments, other cutting mechanisms or tools can be used such as torches or welders.

Figure 2:
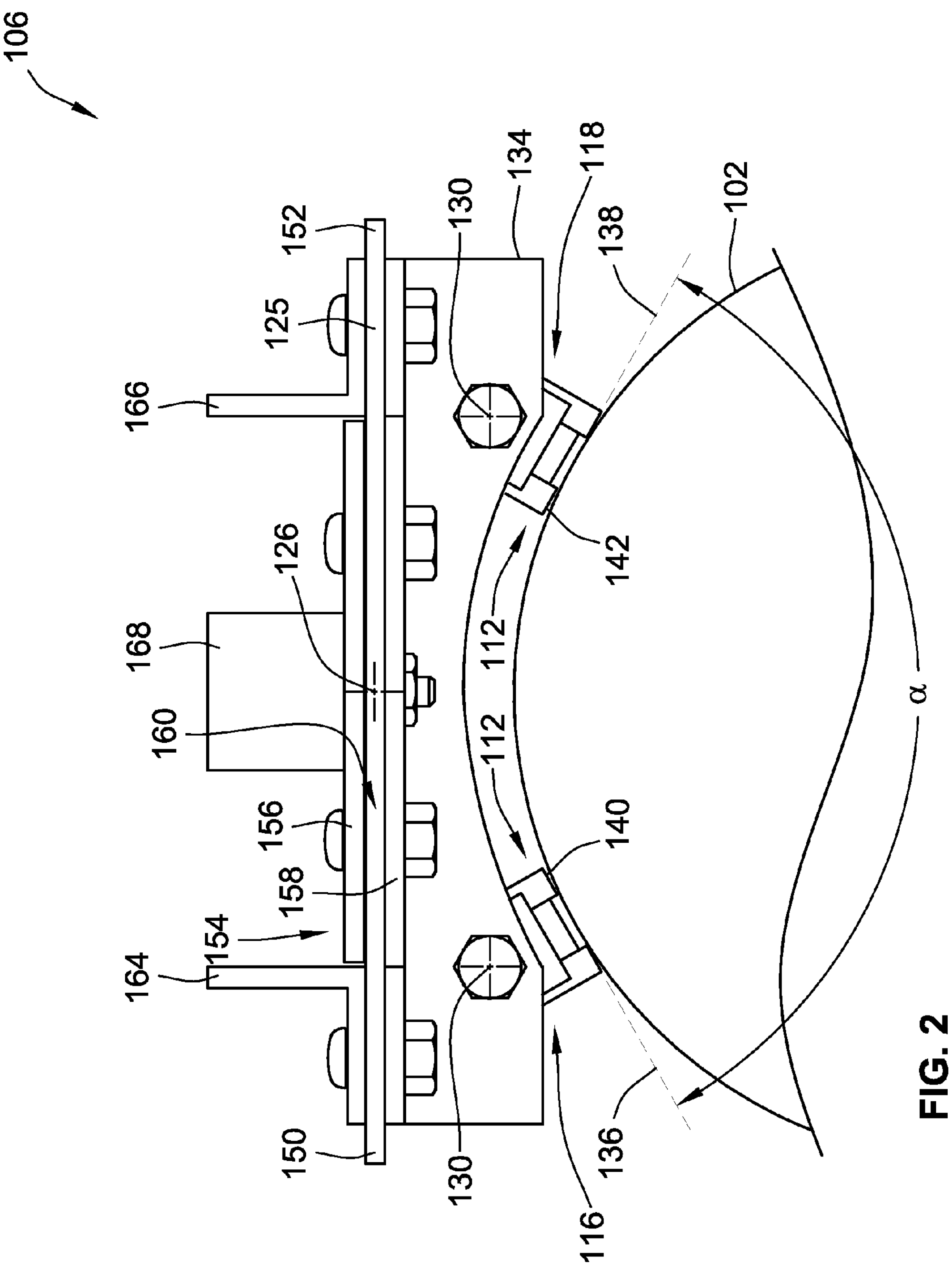
FIG. 2 is a front end view of the track of the cutting system of FIG. 1.

With additional reference to FIG. 2, the track 106 of the cutting system 100 includes a mounting arrangement 112 configured to removably attach to the track 106 to the outer periphery of the pipe 102. Preferably, the mounting arrangement 112 is adjustable and capable of cooperating with pipes 102 having different outer diameters.

The mounting arrangement 112 includes first and second attachment bars 116, 118 that releasably attach to the pipe 102. In one embodiment, the attachment bars 116, 118 include magnets to attach to the pipe 102. However, alternative means for securing to the pipe 102 can be implemented. For instance, suction may be implemented. Preferably, when the attachment bars 116, 118 are magnetic, the magnetic power is selectively adjustable to facilitate releasing the attachment bars 116, 118 from the pipe 102. For instance, a switch may be provided that turns on and off the magnetism. Alternatively, a mechanism for adjusting the power of the magnets can be provided.

Figure 3:
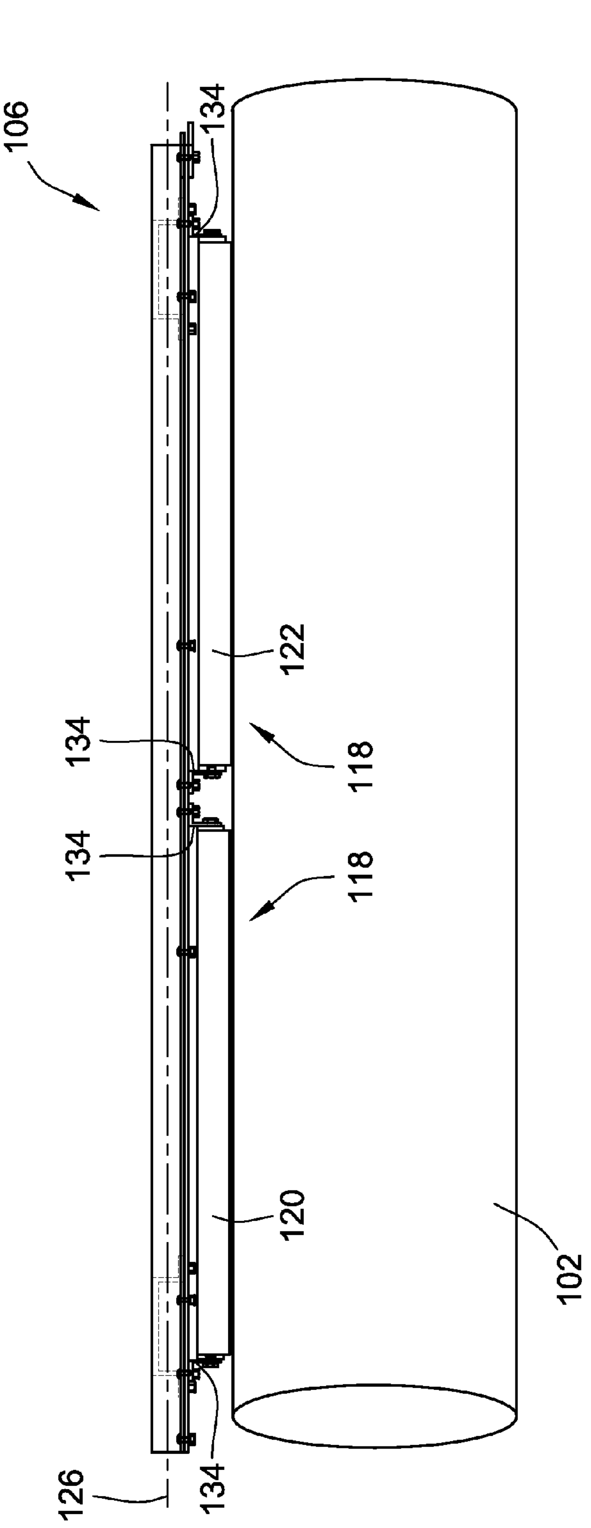
FIG. 3 is a side elevation view of the track of FIG. 2.
Figure 4:
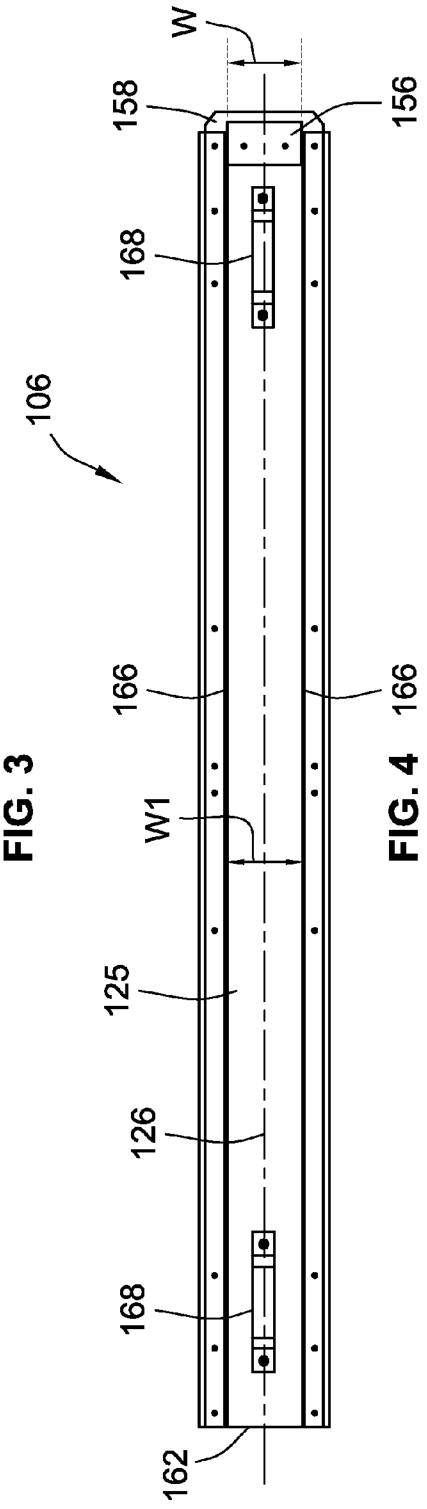
FIG. 4 is a top view of the track of FIG. 2.

With additional reference to FIG. 3, the second attachment bar 118 is illustrated. The second attachment bar 118 is illustrated as a pair of longitudinally offset and generally axially aligned attachment bar segments 120, 122.

The track 106 includes a base 125 that defines a longitudinally extending track axis 126 along which the crawler arrangement 108 travels.

The first and second attachment bars 116, 118 extend longitudinally parallel to the track axis 126 along first and second bar axes 130, 132, which are generally parallel to and laterally offset from the track axis 126 in a direction generally perpendicular to the track axis 126. The first and second attachment bars 116, 118 are operably attached to the base 125 by a plurality of L-shaped mounting brackets 134. In the illustrated embodiment, the first and second attachment bars 116, 118 are attached to the mounting brackets 134 by threaded bolts that are generally co-axial with the first and second bar axes 130, 132.

To allow the mounting arrangement 112 to better accommodate different diameter pipes 102, the first and second attachment bars 116, 118 are rotatably mounted such that the first and second attachment bars 116, 118 are rotatable about the first and second bar axes 130, 132, respectively. This allows the angle $\alpha$ defined between the planes 136, 138 defined by the contact surfaces 140, 142 of the first and second attachment bars 116, 118, respectively to be adjusted according to the outer diameter of pipe 102. As the diameter of the pipe 102 increases, the angle $\alpha$ also preferably increases to provide the best contact between the two contact surfaces 140, 142.

In the illustrated embodiment, the L-shaped mounting brackets 134 are formed from machined angle bar formed from steel. The brackets 134 are mounted to the bottom surface of the base 125 using bolts and nuts. However, the brackets 134 could alternatively be welded to the bottom surface of the base 125 and need not be L-shaped. Further, the bracket could be riveted.

With reference to FIG. 2, the base 125, in the illustrated embodiment, is a longitudinally extending flat plate. When the track 106 is attached to the pipe 102 using the mounting arrangement 112, the track axis 126 is substantially parallel to the longitudinal axis 104 of the pipe 102.

The base 125 operably supports first and second races 150, 152 (see FIG. 2) with which the crawler arrangement 108 cooperates (See FIG. 1 generally) as the crawler arrangement 108 travels along track 106. In the illustrated embodiment, the first and second races 150, 152 are operably supported by being formed directly by the flat plate that defines the base 125. More particularly, the first and second races 150, 152 are formed by opposed sides of the plate forming the base 125 that extend longitudinally parallel to track axis 126. However, in alternative embodiments, the races could be formed by structures attached to base 125. This may be beneficial if it is desired to provide a cheaper lower quality material for base 125 but a more expensive higher quality material for the races 150, 152. Further, the races 150, 152 could take other shapes.

In the illustrated embodiment, the races 150, 152 are spaced laterally outward from the track axis 126 along an offset axis that is generally perpendicular to the track axis 126. The races 150, 152 are preferably spaced laterally outward further than the mounting arrangement 112 and particularly laterally outward further than the first and second attachment bars 116, 118 to reduce the likelihood of interference with any tools carried by the crawler arrangement 108.

The track 106 illustrated is formed from a single track segment. However, the track segment is configured to align with or otherwise connect to one or more track segments to extend the length of races 150, 152 for longer operations.

Each individual segment includes a coupling arrangement for coupling to adjacent segments. In a preferred arrangement, the coupling arrangement is a tongue and groove arrangement where a portion of one end of the track segment engages a portion of the opposite end of the track segment.

In the illustrated embodiment, the coupling arrangement 154 includes a pair of coupling plates 156, 158 that are vertically offset from one another forming a receiving groove 160 therebetween. The top coupling plate 156 is mounted to a top surface of the base 125 and the bottom coupling plate 158 is mounted to the bottom surface of the base 125. As such, the vertical height of the receiving groove 160 is equal to the thickness of the plate forming the base 125. This height, and consequently the thickness of the plate forming base 125, is typically between about 1/16" and 1/2".

The opposite end 162 of the plate forming base 125 is axially received in the receiving groove 160 of second track segment.

The top coupling plate 156 has a width W that is perpendicular to the track axis 126 that is substantially equal to or slightly less than a width W1 formed between a pair of stiffening ribs 164, 166 that extend outward from the top surface of the base 125. The top coupling plate 156 is axially received into the slot or groove formed transversely between the stiffening ribs 164, 166. The cooperation of the top coupling plate and the stiffening ribs 164, 166 forms a transverse alignment structure that transversely locates the adjacent track segments relative to one another and to properly align the races of the adjacent track segments. While not illustrated, the distal end of the top coupling plate 156 may be tapered to facilitate axial insertion between the stiffening ribs 164, 166 of the adjacent track segment. Further, alternative transverse alignment structures could be provided. For instance, latches could be provided or the track segments could include aligning holes through which bolts or pins extend to properly align adjacent track segments.

The stiffening ribs 164, 166 also provide strength to the base 125 of the track 106 while keeping the weight thereof relatively low. In the illustrated embodiment, the stiffening ribs 164, 166 are provided by angle brackets that run the axial length of the base 125 and that are bolted to the top surface of the base 125.

One or more handles 168 may be attached to the base 125 to facilitate handling of the track. In the illustrated embodiment, the handles 168 are attached to the top surface of the plate forming base 125 and are transversely interposed between the stiffening ribs 164, 166.

With reference to FIG. 1, the crawler arrangement 108 is operably mounted to the track 108 such that the crawler arrangement 106 can travel longitudinally along the pipe 102 in a substantially linear manner.

In a preferred embodiment, the crawler arrangement 108 is automatically driven and includes a drive motor 170 that is operably coupled to a plurality of drive wheels 172, 174 that cooperate with the first and second races 150, 152. While only two drive wheels 172, 174 are illustrated in FIG. 1, typically, the crawler arrangement 108 will include at least 4 drive wheels (two on each side of the track). The drive wheels 172, 174 function as guides that cooperate with races 150, 152. However, in other embodiments, the guides could be non-powered.

The crawler arrangement 108 generally includes a body 176 that operably supports the drive motor 170 and to which the drive wheels 172, 174 are operably attached.

The crawler arrangement 108 includes a pair of tool mounting mechanisms 178, 180 that include tool couplings 182, 184 that are configured to hold tools such as cutting tools and particularly plasma cutters 110. The crawler arrangement 108 is configured such that the tool mounting mechanisms 178, 189 are adjustable to change the relative position and orientation of the tool couplings 182, 184 to accommodate different size pipe, different tools, different tool orientations, etc.

The tool mounting mechanisms 178, 180 in the illustrated embodiment each include a horizontal arm segment 186, 188 that are attached to and extend transversely outward from the body 176 generally along horizontal axis 186. In the illustrated embodiment, the horizontal arm segments 186, 188 are provided by a single cylindrical rod. However, they could be separate components. The horizontal arm segments 186, 188 may be adjusted linearly inward or outward along first horizontal axis 189 to provide a first degree of adjustment. Additionally, the horizontal arm segments 186, 188 can be rotated about first horizontal axis 189 to provide a second degree of adjustment.

Each tool mounting mechanism includes a vertical arm segment 190, 192 operably attached to the corresponding horizontal arm segment 186, 188 by an appropriate connector 194, 196. The connectors 194, 196 preferably allow for linearly adjusting the position of the vertical arm segments 190, 192 relative to horizontal arm segments 186, 188 along vertical axes 198, 200. The connectors 194, 196 also preferably allow for angular rotation of the vertical arm segments 190, 192 about the vertical axes 198, 200. The connectors 194, 196 also preferably allow for angular adjustment of the angle $\alpha 1$, $\alpha 2$ formed between the horizontal and vertical arm segments 186, 188, 190, 192 about axes 202, 204. Further, the connectors 194, 196 may also allow for adjustment of the orientation of the vertical arm segments 190, 192 relative to the horizontal arm segments 186, 188 by allowing for rotation about the horizontal axis 189, e.g. such that the tool couplings 182, 184 would be moved into or out of the page as illustrated in FIG. 1.

The tool couplings 182, 184 are also adjustable relative to the vertical arm segments 190, 192. The tool couplings 182, 184 are linearly adjustable along vertical axes 198, 200. The tool couplings 182, 184 are angularly adjustable about axes 206, 208. Further, the tool couplings 182, 184 may also be rotated angularly about vertical axes 198, 200. In some embodiments, the position of the tool, such as plasma cutters 110, may be adjusted toward or away from the pipe relative to the tool couplings 182, 184 along axes 210, 212.

Figure 5:
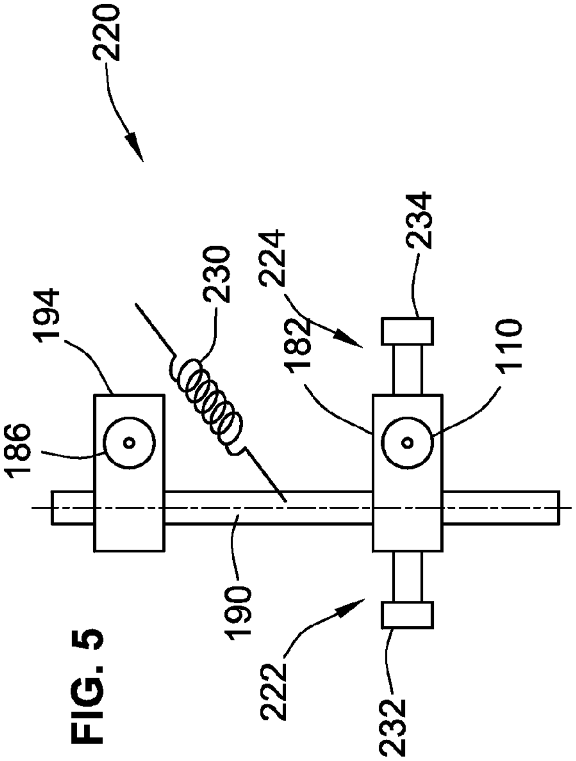
FIG. 5 is a side view illustration take about line 5-5 of FIG. 1 of a portion of a tool mounting mechanism of the cutting system of FIG. 1.
Figure 6:
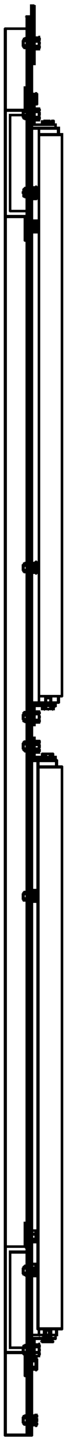
FIG. 6 is a side elevation view of the track of FIG. 2 removed from the pipe.
Figure 7:
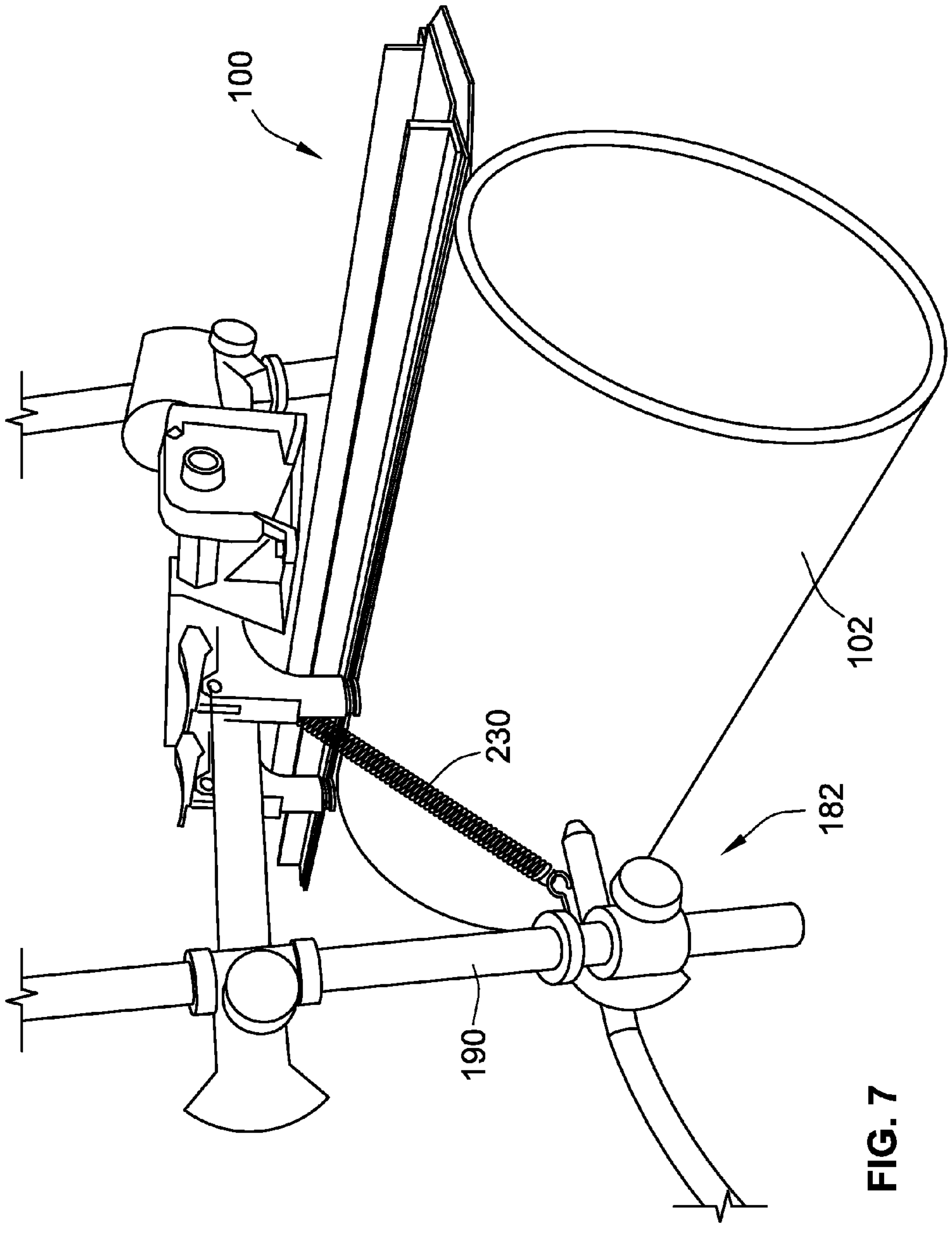
FIGS. 7-15 are illustrations of an embodiment of the cutting system.
Figure 8:
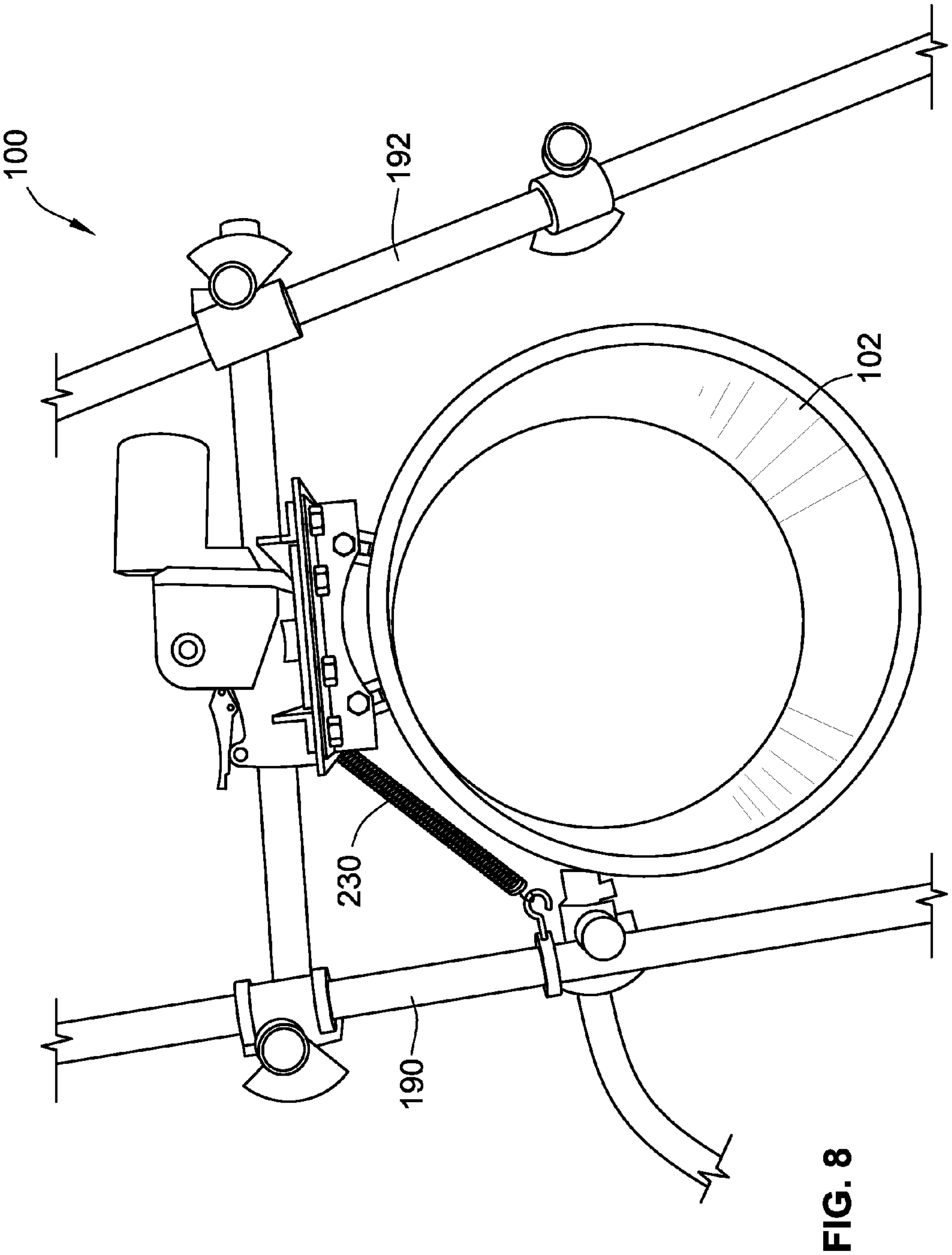
Figure 9:
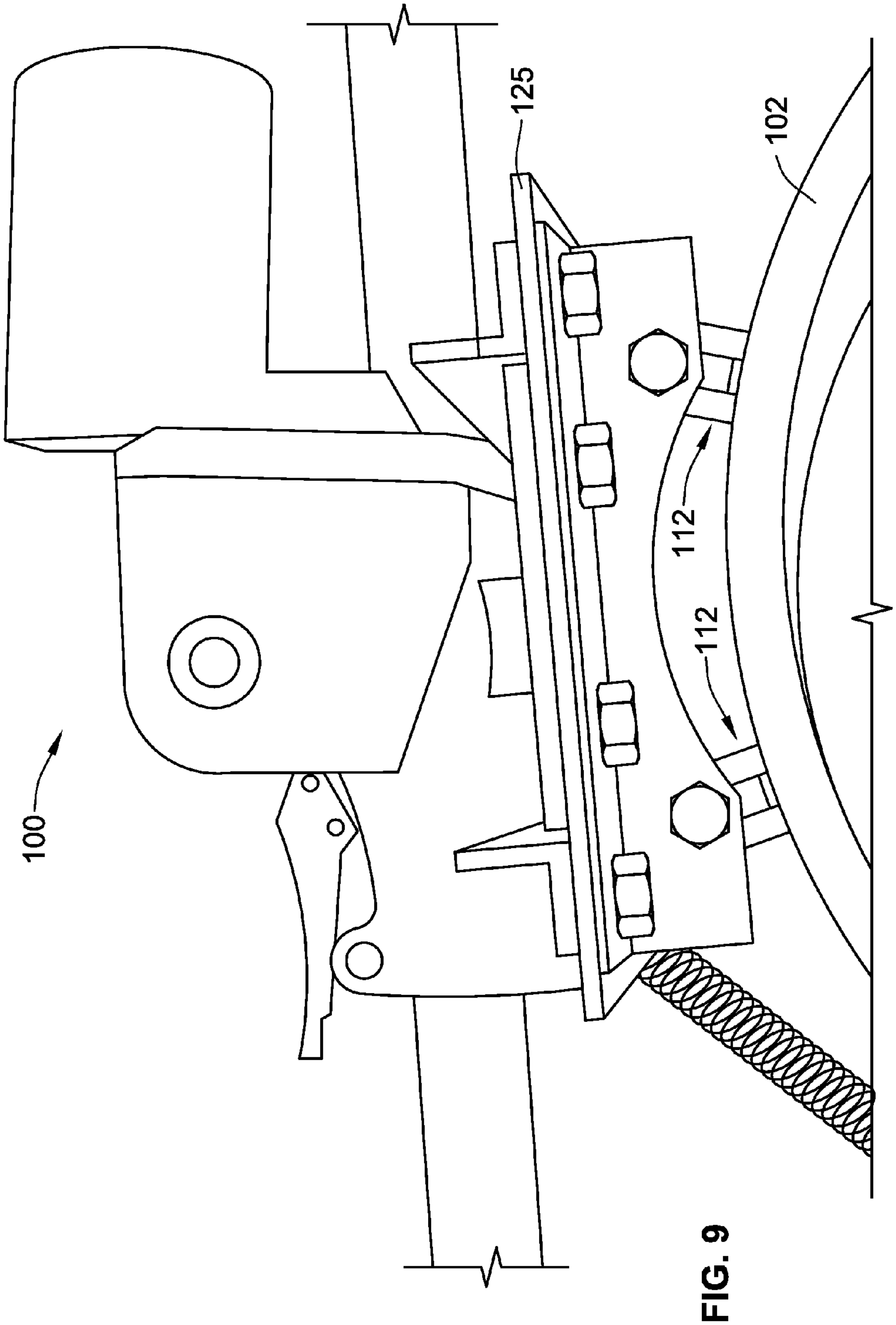
Figure 10:
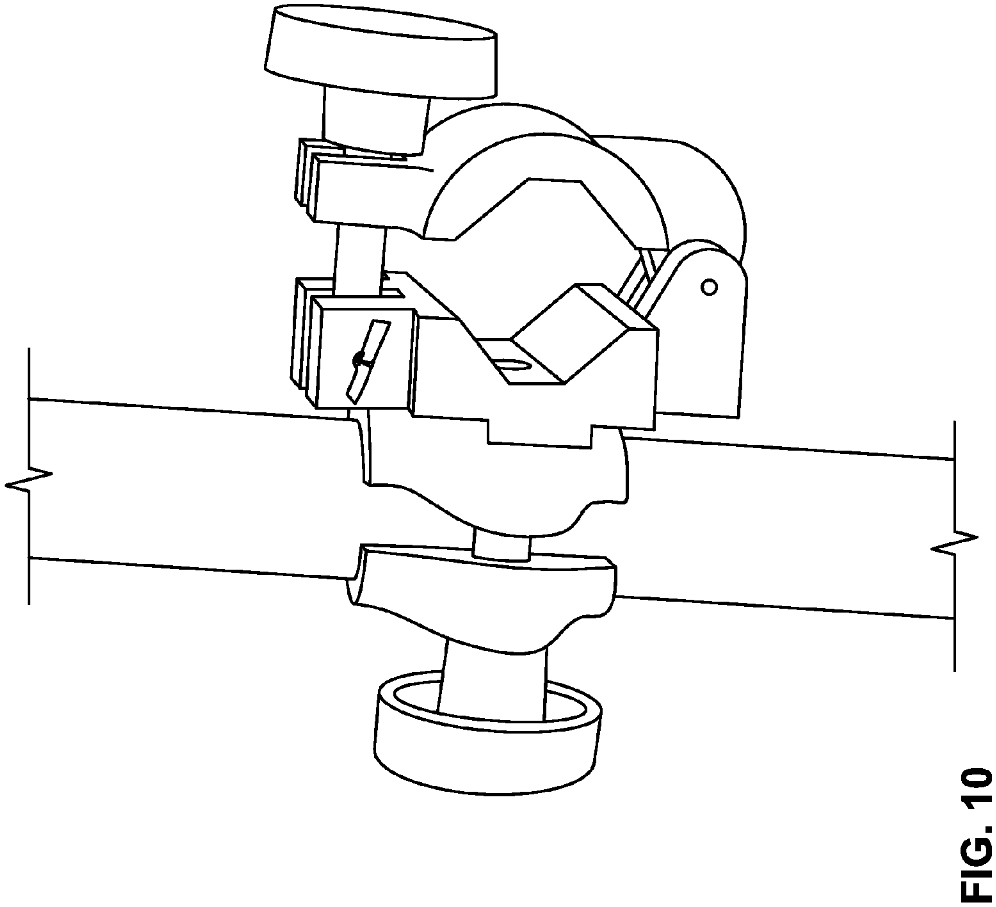
Figure 11:
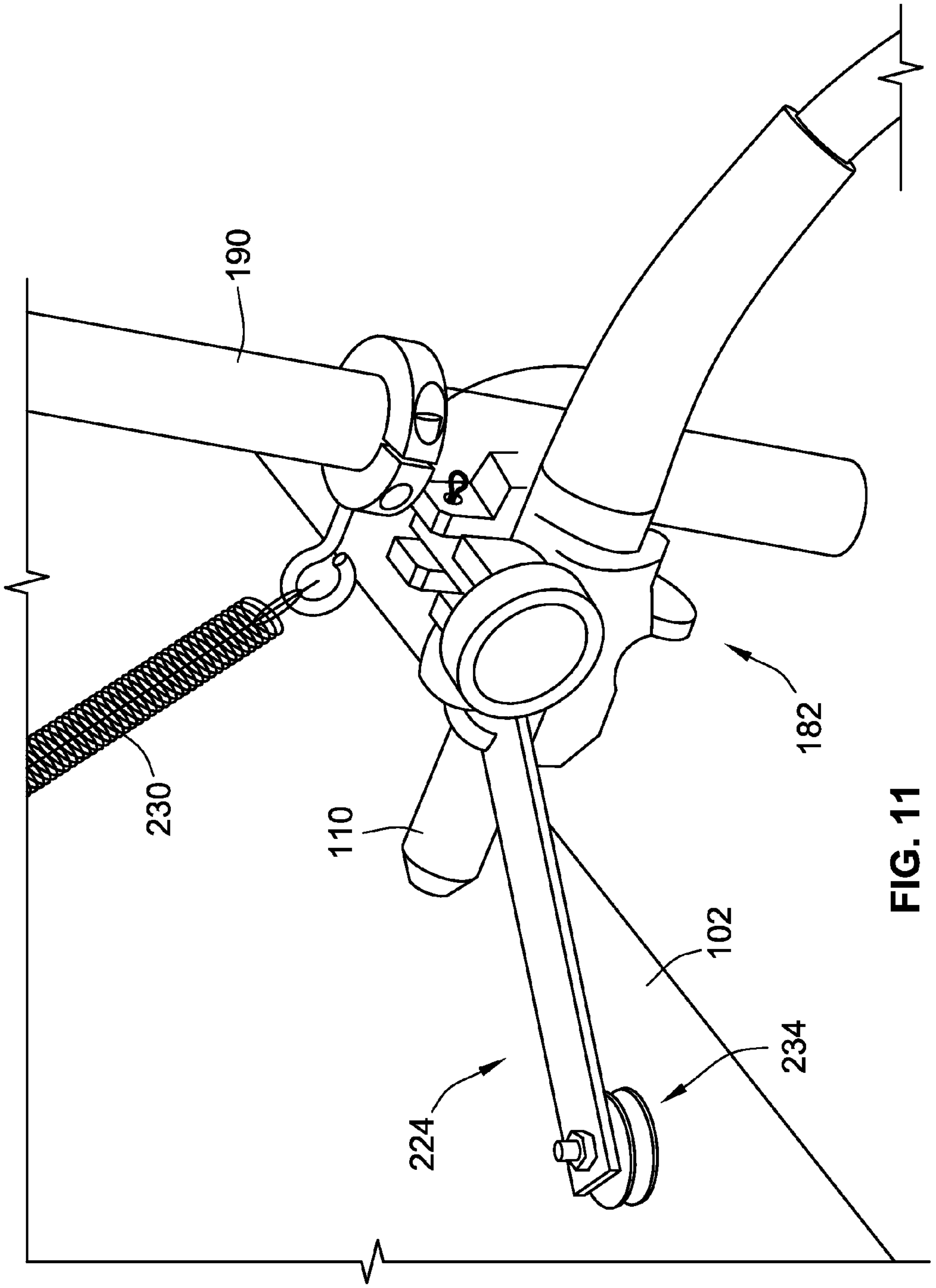
Figure 12:
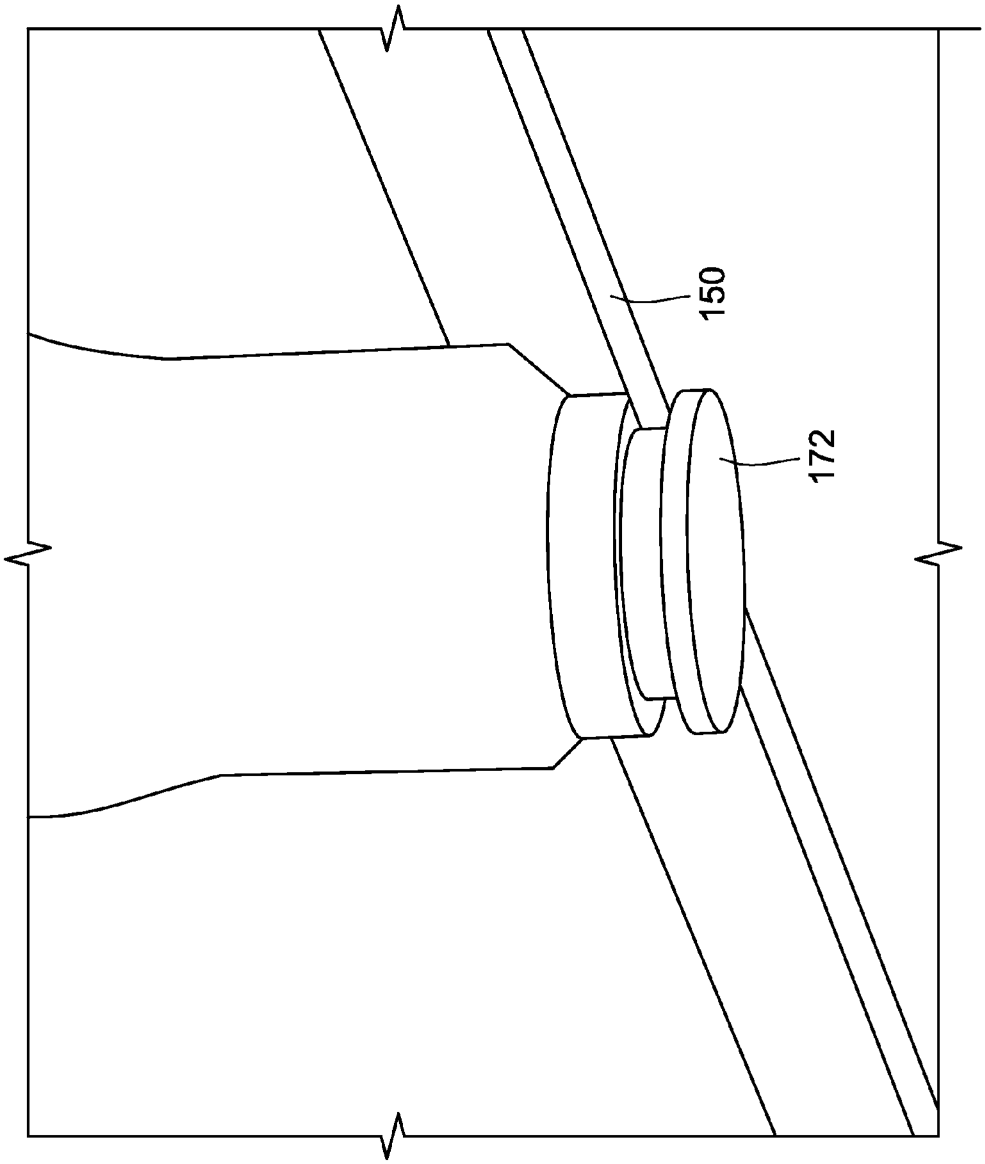
Figure 13:
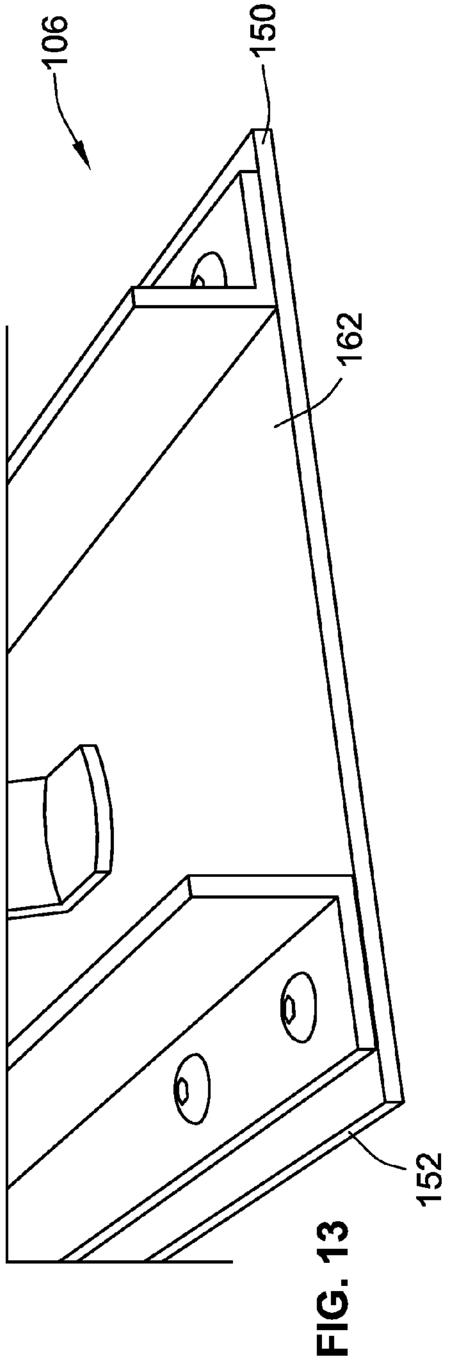
Figure 14:
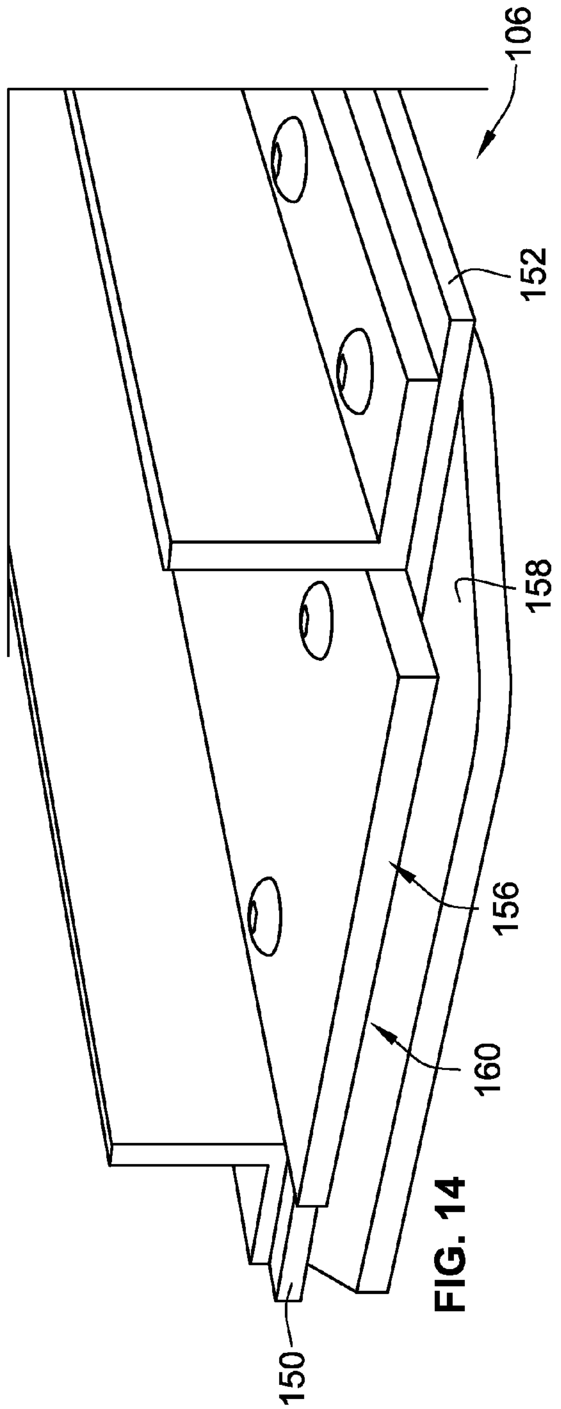
Figure 15:
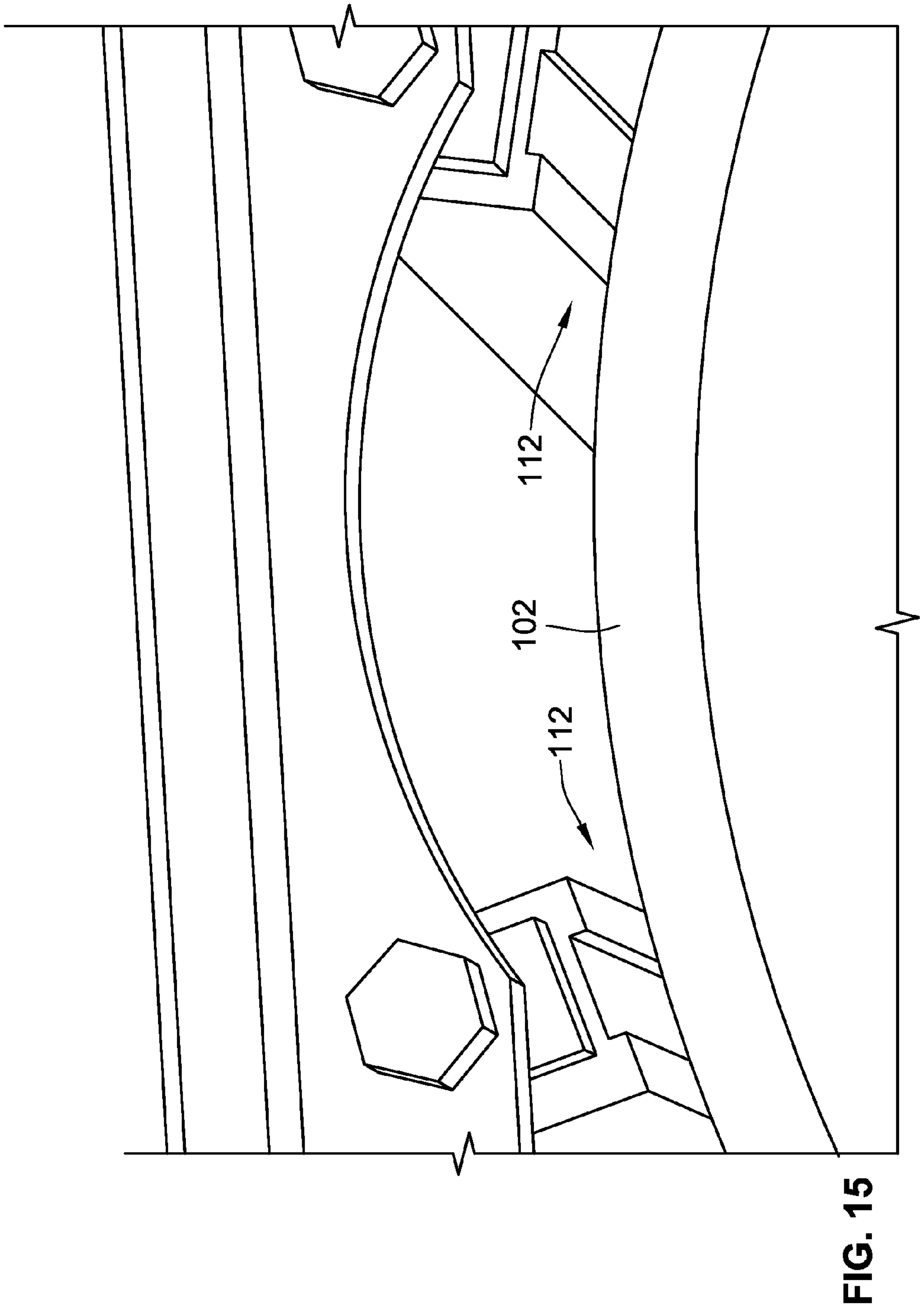

With reference to FIG. 5, the tool mounting mechanisms 178, 180 preferably include tool guide mechanisms for maintaining the proper spacing between the attached tool, such as plasma cutters 110, and the outer surface of the pipe 102. This is because the pipe may not be perfectly straight.

In FIG. 5, only the tool guide mechanism 220 for use with tool coupling 182 is illustrated. However, it will be understood that such a tool guide mechanism 220 can also be used with tool coupling 184. The tool guide mechanism 220 includes a pair of surface followers 222, 224 on opposed axial sides of the tool coupling 182 generally offset in a direction parallel to the track axis 125. The surface followers 222, 224 ride on the outer surface of the pipe 102 during operation and act as a gage maintaining the proper spacing between the tool coupling 182 and the outer surface of the pipe 102. This allows for setting the proper spacing of the tool relative to the surface of the pipe.

Preferably, the tool guide mechanism 220 includes a biasing member, illustrated schematically as spring 230 that biases the tool coupling towards the pipe 102. This biasing member creates a torque about axis 202 to maintain the surface followers 222, 2224 against the outer surface of the pipe 102. In one embodiment, the surface followers 222, 224 include guide wheels 232, 234 to reduce friction.

Methods of the invention include mounting the track 106 to a pipe including coupling a plurality of track segments. They further include mounting the crawler arrangement 108 to the track 106 and properly positioning the tool couplings relative to the outer surface of the pipe 102. Methods further include cutting or welding the pipe.

Using the disclosed cutting system and methods, cutting speeds can be significantly increased. For instance, while cutting by hand an operator may cut up to approximately 12 inches per minute, using embodiments of the instant invention, cutting speeds in excess of 110 inches per minute may be achieved, while making two cuts at a single time for an effective cutting speed in excess of 220 inches per minute. Further, the accuracy and straightness using embodiments of the present invention is greatly increased.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A track for guiding a crawler apparatus axially along a longitudinal axis of a pipe, the track comprising:

a longitudinal base extending longitudinally along a track axis that is parallel to the longitudinal axis of the pipe when mounted thereto;

first and second races operably supported by the base, the first and second races extending parallel to the track axis and being laterally offset from one another along an axis that is perpendicular to the track axis, wherein the first and second races extend substantially the entire length of the pipe when mounted to the pipe; and an adjustable mounting arrangement operably attached to the base for operably releasably securing the base and the first and second races to pipes having different outside diameters, the adjustable mounting arrangement including first and second attachment bars, the first and second attachment bars being transversely offset relative to one another along an offset axis that is perpendicular to the track axis, the first attachment bar being rotatably mounted for rotation about a first bar axis that is parallel to the track axis, the second attachment bar being rotatably mounted for rotation about a second bar axis that is parallel to the track axis.

2. The track of claim 1, wherein the track is comprised of a plurality of track segments and a coupling arrangement for coupling the plurality of track segments in end-to-end relation, the coupling arrangement including a tongue and groove arrangement, wherein the tongue of the tongue and groove arrangement is located proximate a first end of the base of a track segment and the groove of the tongue and groove arrangement is located proximate a second end of the base of a track segment.

3. The track of claim 2, wherein the coupling arrangement has transverse alignment structures configured to align the first and second races with a set of first and second races of a second track segment when a plurality of track segments are coupled to one another using the coupling arrangements thereof.

4. The track of claim 1, wherein the first and second attachment bars are magnetic.

5. The track of claim 1, wherein the first and second attachment bars are selectively magnetic such that the magnetic power of the attachment bars can be selectively decreased to release the first and second attachment bars from the pipe.

6. The track of claim 1, further comprising at least one handle interposed between the first and second races.

7. The track of claim 1, further comprising a first mounting bracket operably attached to the base proximate a first end of the base and a second mounting bracket operably attached to the base proximate a second end of the base axially offset from the first mounting bracket along the track axis, the first and second attachment bars rotatably mounted to the first and second mounting brackets.

8. The track of claim 1, wherein the base is formed from flat plate, the plate having first and second opposed sides that extend parallel to the track axis, the first side of the plate providing the first race and the second side of the plate providing the second race.

9. The track of claim 8, wherein a thickness of the flat plate is between about 1/16" and 1/2".

10. The track of claim 9, wherein the flat plate defines a top surface and a bottom surface, the bottom surface facing towards a pipe when mounted thereto, the top surface facing away from the pipe when mounted thereto; and further comprising stiffening ribs extending outward from the top surface and longitudinally along the base parallel to the track axis.

11. The track of claim 10, wherein the stiffening ribs are L-shaped angle brackets affixed to the top surface.

12. The track of claim 1, wherein the adjustable mounting arrangement is positioned laterally between the first and second races.

13. A cutting system for longitudinally cutting a pipe defining a longitudinal axis, the cutting system comprising:

a removable track including:

a longitudinal base extending longitudinally along a track axis that is parallel to the longitudinal axis of the pipe when mounted thereto;

first and second races operably supported by the base, the first and second races extending parallel to the track axis and being laterally offset from one another along an axis that is perpendicular to the track axis; and a mounting arrangement operably attached to the base for operably releasably securing the base and the first and second races to a pipe; and a crawler arrangement configured to follow the track and carry at least one cutting device for cutting the pipe parallel to the longitudinal axis of the pipe when mounted, the crawler arrangement including:

a first guide configured to engage and travel along the first race;

a second guide configured to engage and travel along the second race, the first and second guides being transversely offset from one another such that the based is transversely interposed between the first and second guides when the crawler arrangement is mounted to the removable track;

wherein the first and second guides provide a single degree of freedom parallel to the longitudinal axis of the pipe when mounted and permit the crawler to travel substantially the entire length of the pipe while cutting the pipe parallel to the longitudinal axis of the pipe;

a tool mounting mechanism operably attached to the first and second guides including a tool coupling configured to secure at least one cutting tool in an offset position from the removable track.

14. The cutting system of claim 13, wherein the mounting arrangement is adjustable for mounting the track to pipes having different diameters, the mounting arrangement including first and second attachment bars, the first and second attachment bars being transversely offset relative to one another along an offset axis that is perpendicular to the track axis, the first attachment bar being rotatably mounted for rotation about a first bar axis that is parallel to the track axis, the second attachment bar being rotatably mounted for rotation about a second bar axis that is parallel to the track axis.

15. The cutting system of claim 13, wherein:

the tool mounting mechanism is linearly adjustable along a first axis that is generally perpendicular to the track axis; and the tool mounting mechanism is linearly adjustable along a second axis that is generally perpendicular to the first axis.

16. The cutting system of claim 15, wherein the tool mounting mechanism is rotatably adjustable about the first and second axes.

17. The cutting system of claim 16, wherein the tool coupling is rotatable about a third axis that is generally perpendicular to the first and second axes.

18. The cutting system of claim 13, further comprising a tool guide mechanism configured to maintain the tool coupling at a desired relative position relative to an outer surface of the pipe as the crawler travels along the pipe, the guide mechanism including a pipe surface follower that operably rides along the outer surface of the pipe proximate a cutting location of the pipe and that is operably attached to the tool coupling, the tool guide mechanism further including a biasing mechanism configured to bias the tool coupling and the pipe surface follower toward the pipe.

19. The cutting system of claim 18, wherein the tool mounting mechanism further includes:

a first arm segment that extends laterally outward along a first axis that is generally perpendicular to the track axis;

a second arm segment that is pivotably coupled to the first arm segment for rotation about a fourth axis, the second arm being mechanically operably interposed between the tool coupling and the first arm segment; the biasing mechanism creating a torque about the fourth axis biasing a distal end of the second arm segment and the tool coupling towards the pipe when mounted thereto.

20. The cutting system of claim 13, wherein the track is formed from a plurality of substantially similar track segments, each track segment includes a coupling arrangement configured for coupling the track segment with another one of the track segments with the first races of the track segments substantially co-axial and the second races of the track segments substantially co-axial.

* * * * *